(12) United States Patent
Leon

(10) Patent No.: US 6,365,705 B1
(45) Date of Patent: Apr. 2, 2002

(54) SPIRO-AMMONIUM IONOMER CARBOXYLATES

(75) Inventor: Jeffrey W. Leon, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/699,710

(22) Filed: Oct. 30, 2000

(51) Int. Cl.⁷ .............................................. C08G 69/44
(52) U.S. Cl. ..................... 528/289; 528/288; 528/271; 528/290; 528/298; 528/403; 528/423; 528/425
(58) Field of Search ................. 528/271, 288, 528/289, 290, 298, 403, 423, 425

(56) References Cited

U.S. PATENT DOCUMENTS

| | | |
|---|---|---|
| 4,081,572 A | 3/1978 | Pacansky |
| 4,405,705 A | 9/1983 | Etoh et al. |
| 4,548,893 A | 10/1985 | Lee et al. |
| 4,634,659 A | 1/1987 | Esumi et al. |
| 4,693,958 A | 9/1987 | Schwartz et al. |
| 5,382,492 A * | 1/1995 | El-Sayed et al. ............ 430/115 |

FOREIGN PATENT DOCUMENTS

| | | |
|---|---|---|
| EP | 0 652 483 A1 | 5/1995 |
| EP | 0 924 102 A1 | 6/1999 |
| WO | WO 92/09934 | 6/1992 |

OTHER PUBLICATIONS

"Polymer Bulletin" 24, (Berlin), K. Mullen et al, pp 263–269, 1990.
"Macromol. Rapid Commun." 18, V. DeVynck et al., pp 149–156, 1997.

* cited by examiner

*Primary Examiner*—Samuel A. Acquah
(74) *Attorney, Agent, or Firm*—J. Lanny Tucker

(57) ABSTRACT

Ionomers (charged polymers) have carboxylate recurring units in their backbones and ammonium counterions for the carboxylate recurring units. One or more positively charged nitrogen atoms of the counterions are positioned at tetrahedral vertices of one or more spiro bicyclic ring systems.

11 Claims, No Drawings

SPIRO-AMMONIUM IONOMER CARBOXYLATES

FIELD OF THE INVENTION

This invention relates to novel polymers that have net negatively charged backbones and spiro-ammonium cations. These polymers are particularly useful in heat-sensitive printing plate formulations.

BACKGROUND OF THE INVENTION

There is current interest in the development of polymers that undergo irreversible thermally driven reactions. Such reactions may result in crosslinking chemistry, changes in solubility, or changes in the surface energy of a polymer film. There is also considerable interest in the minimization of volatile organic compounds in coating compositions. Thus, thermally-sensitive polymers that are water-soluble or water-dispersible are of particular value. The ability of a polymer to undergo such thermally driven changes by means of a reaction in which small molecule byproducts are not emitted is also desirable for many chemical and coating processes in many industries.

U.S. Pat. No. 5,512,418 (Ma) describes the use of polymers having cationic quaternary ammonium groups that are heat-sensitive.

Low molecular weight (monomeric) spiro-ammonium salts (1-azoniaspiro salts) are known in the field of organic chemistry. Cationic polymers containing spiro-ammonium ions covalently bound within the main chain are also known in the art, having found uses as mordants. See, for example, Muellen et al, *Polym. Bull.* (Berlin), 1990, 24, 263, De Vynck et al, *Macromol. Rapid. Commun,* 1997, 18, 149, and U.S. Pat. No. 3,741,768 (Van Paesschen et al).

These compounds, however, are undesirable for several reasons. First of all, the ammonium cations described in the prior art are immobilized within the polymer backbone. This would affect their solubility and usefulness in thermally-sensitive systems. Moreover, it is highly unpredictable as to what interactions or compatibility they might have with other common ingredients in industrial and coating formulations (such as surfactants, colorants, and thickeners). From the perspective of synthetic feasibility, it is typically more difficult to incorporate specific units (in this case, a spiro-quaternary ammonium ring system) into the main chain of a polymer than it is to introduce a desired counterion.

There is a need to provide thermally-sensitive polymers that do not exhibit the noted problems, and that are prepared from common and inexpensive starting materials.

SUMMARY OF THE INVENTION

This invention provides an ionomer having carboxylate recurring units in its backbone and an ammonium counterion for the carboxylate recurring units wherein one or more positively charged nitrogen atoms of the counterion are positioned at tetrahedral vertices of one or more spiro bicyclic ring systems.

The polymers (ionomers) of this invention are specifically designed to undergo thermally driven nucleophilic substitution reactions in which the carboxylate moieties ionically bound to the polymer backbone attack the carbon atoms in the α-position in relation to the quaternary ammonium centers of spiro-ammonium counterions. This results in the cleavage of carbon-nitrogen bonds, the formation of ester bonds, and the dequaternization of the ammonium ions. This reaction will result in changes in solubility and surface energy of the polymer. The advantage of the spiro-ammonium counterion lies in the fact that no matter which of the carbon positions (α to the quaternary ammonium center) are attacked, the tertiary amine product remains bound to the polymer backbone by an ester bond and no volatile compounds are emitted. This reaction is exemplified in Reactive Scheme 1 below.

Reactive Scheme 2 below shows a similar reaction in which a dicationic counterion is used in the polymer. In that situation, the resulting polymer is crosslinked and no volatile compounds are emitted.

The polymers of this invention may find utility in water-based thermally hardenable coating formulations. This class of novel materials is particularly useful for markets and applications having stringent environmental requirements. These polymers are also useful in thermal imaging applications, such as thermally-sensitive printing plates, as described in copending U.S. Ser. No. 09/454,151, filed Dec. 3, 1999 by Leon and Fleming.

It is also an advantage that some polymers of this invention can be derived from such common and inexpensive ethylenically unsaturated polymerizable monomers as acrylic acid and methacrylic acid, and hence can be easily copolymerized with other common monomers using known techniques and reliable methods.

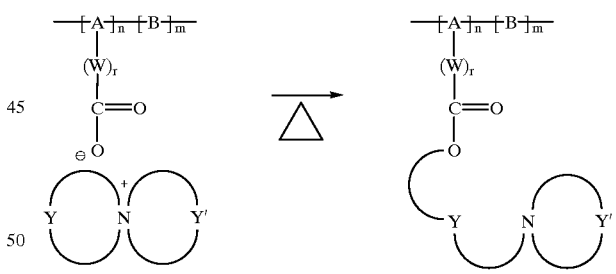

Reactive Scheme 1

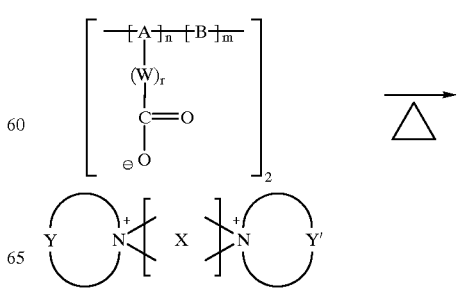

Reactive Scheme 2

-continued

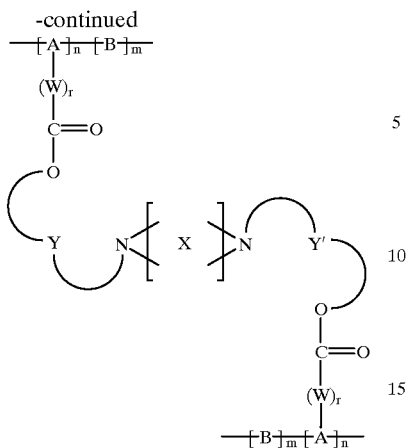

DETAILED DESCRIPTION OF THE INVENTION

The polymers of this invention comprise random recurring units at least some of which comprise carboxylic acids groups and the particular spiro-ammonium cations described herein. The polymers generally have a molecular weight of at least 2000 Daltons and preferably of at least 5000 Daltons.

The carboxylate-containing polymers can be chosen or derived from a variety of polymers and copolymer classes including but not limited to polyamic acids, polyesters, polyamides, polyurethanes, silicones, proteins (such as modified gelatins), polypeptides, and polymers and copolymers based on ethylenically unsaturated polymerizable monomers such as acrylates, methacrylates, acrylamides, methacrylamides, vinyl ethers, vinyl esters, maleic acid/anhydride, itaconic acid/anhydride, styrenics, acrylonitrile, and olefins such as butadiene, isoprene, propylene, and ethylene. The starting polymers can contain more than one type of carboxylic acid-containing monomer. Certain monomers, such as maleic acid/anhydride and itaconic acid/anhydride may contain more than one carboxylic acid unit.

Preferably, the polymers are represented by the following Structure I or II:

I

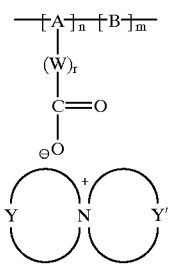

II

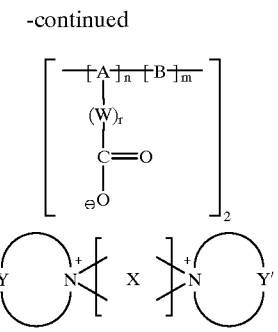

wherein the carboxylate-containing recurring units are linked directly (r is 0) within the polymer backbone in the recurring units identified as "A" units, or are connected by linking spacer units (r is 1) identified as "W" in Structures I and II above. This spacer unit can be any divalent aliphatic, alicyclic or aromatic group that does not adversely affect the polymer's heat-sensitivity. For example, "W" can be a substituted or unsubstituted alkylene group having 1 to 16 carbon atoms (such as methylene, ethylene, isopropylene, n-propylene and n-butylene), a substituted or unsubstituted arylene group having 6 to 10 carbon atoms in the arylene ring (such as m- or p-phenylene and naphthylenes), substituted or unsubstituted combinations of alkylene and arylene groups (such arylenealkylene, arylenealkylenearylene and alkylenearylenealkylene groups), and substituted or unsubstituted N-containing heterocyclic groups. Any of these defined groups can be connected in a chain with one or more amino, carbonamido, oxy, thio, amido, oxycarbonyl, aminocarbonyl, alkoxycarbonyl, alkanoyloxy, alkanoylamino or alkaminocarbonyl groups. Particularly useful "W" spacers contains an ester or amide connected to an alkylene group or arylene group (as defined above), such as when the ester and amide groups are directed bonded to "A".

While "r" can be 0 or 1 in Structure I, preferably r is 0.

Preferably, A represents recurring units derived from ethylenically unsaturated polymerizable acrylates, methacrylates, acrylamides, methacrylamides, maleic acid or anhydride, or itaconic acid or anhydride.

Additional monomers (non-carboxylate monomers) that provide the recurring units represented by "B" in Structure I above include any useful hydrophilic or oleophilic ethylenically unsaturated polymerizable comonomers that may provide desired physical or chemical properties or which provide crosslinkable functionalities. One or more "B" monomers may be used to provide these recurring units, including but not limited to, acrylates, methacrylates, styrene and its derivatives, acrylamides, methacrylamides, olefins, vinyl halides, vinyl ethers, and any monomers (or precursor monomers) that contain carboxy groups (that do not have spiro-quaternary ammonium counterions).

The quaternary ammonium counterions in the polymers can include any compounds that comprise a tetracoordinate nitrogen positioned at the vertex of two intersecting ring systems. Preferably, these ring systems are represented by X, Y, and Y' in Structures I and II taken with the illustrated nitrogen atoms.

Y and Y' independently comprise any combination of carbon, nitrogen, oxygen, sulfur, phosphorous or selenium atoms sufficient to complete one or more heterocyclic ring systems with the illustrated nitrogen atom, each ring system independently having at least three atoms. Preferably, Y and Y' independently complete ring systems with the illustrated nitrogen atom that can have from 3 to 9 atoms (carbon and heteroatoms). Such ring systems include, but are not limited to aziridine, azetidine, morpholine, piperidine, oxapyrrolidine, pyrrolidine, carbazole, indoline, and isoindoline rings. Additionally, the ring systems can contain one or more double bonds or may themselves be units in a more complex fused or compound ring system.

In Structure II, X represents at least two additional carbon, nitrogen, oxygen or sulfur atoms that together with the two illustrated nitrogen atoms, complete at least a 4-membered heterocyclic ring system located between the ring systems defined by Y and Y'. The types of ring systems that define X can be similar to those defined by Y and Y' except that they have at least four valencies available for bonding to the two illustrated nitrogen atoms.

The individual atoms composing X, Y, and Y' can contain substituents sufficient to fulfill the valency requirements. These substituents include independently substituted or unsubstituted cyclic, branched, or linear alkyl groups having 1 to 20 carbon atoms [such as methyl, ethyl, n-propyl, isopropyl, t-butyl, hexyl, hydroxyethyl, 2-propanonyl, ethoxycarbonymethyl, benzyl, substituted benzyl (such as 4-methoxybenzyl, o-bromobenzyl, and p-trifluoromethylbenzyl), and cyanoalkyl], or substituted or unsubstituted aryl groups having 6 to 14 carbon atoms in the carbocyclic ring (such as phenyl, naphthyl, xylyl, p-methoxyphenyl, p-methylphenyl, m-methoxyphenyl, p-chlorophenyl, p-methylthiophenyl, p-N,N-dimethylaminophenyl, methoxycarbonylphenyl and cyanophenyl). Other useful substituents for these various groups would be readily apparent to one skilled in the art, and any combinations of the expressly described substituents are also contemplated.

Alternatively, multi-cationic ionic species containing more than one quaternary ammonium unit covalently bonded together and having charges greater than +1 (for example +2 for diammonium ions, and +3 for triammonium ions) may be used in these novel polymers.

Also in Structure I, n represents from about 1 to 100 mol % (preferably from about 50 to 100 mol %) and m represents 0 to about 99 mol % (preferably from 0 to about 50 mol %).

While Structure I could be interpreted to show polymers comprised of only two types of recurring units, it is intended to include terpolymers and other polymers derived from more than two ethylenically unsaturated polymerizable monomers.

The spiro-ammonium ions of the present invention can be readily prepared using modifications of well known synthetic methods that are widely used for the synthesis of quaternary ammonium salts. These methods are described in many basic synthetic textbooks including March, *Advanced Organic Chemistry*, 3$^{rd}$ Ed., John Wiley & Sons, New York, 1985. Such methods will be obvious to one skilled in organic synthesis. One particularly useful synthetic method involves the reaction of a cyclic, secondary amine with a compound containing two leaving groups (such as halide or sulfonate esters) that are positioned in such a way that makes ring closure a facile pathway. The reaction of ammonia with two equivalents of such a compound will yield a symmetric spiro-ammonium salt.

The parent backbone polymers of this invention can be readily prepared using many methods that will be obvious to one skilled in the art. Many carboxylic acid or anhydride-containing polymers are commercially available. Others can be readily synthesized using preparative techniques that will be obvious to one skilled in the art.

The carboxylic acid or anhydride-containing polymers can be converted to the desired quaternary ammonium carboxylate salt by a variety of methods including, but not necessarily limited to:

1) the reaction of a carboxylic acid or acid anhydride-containing polymer with the hydroxide salt of the desired quaternary spiro-ammonium ion, 2) the use of ion exchange resin containing the desired quaternary spiro-ammonium ion, 3) the addition of the desired spiro-ammonium ion to a solution of the carboxylic acid-containing polymer or a salt thereof followed by dialysis, 4) the addition of a volatile acid salt of the desired spiro-ammonium ion (such as an acetate or formate salt) to a carboxylic acid-containing polymer followed by evaporation of the volatile component upon drying, 5) electrochemical ion exchange techniques, 6) the polymerization of monomers containing the desired spiro-ammonium carboxylate units, and 7) the combination of a specific salt of the carboxylic acid-containing polymer and a specific spiro-ammonium salt, both chosen such that the undesired counterions will form an insoluble ionic compound in a chosen solvent and can be removed after precipitate.

The following examples are illustrative of the practice of this invention to prepare the following representative polymers (in aqueous solutions) and are not meant to be limiting in any manner.

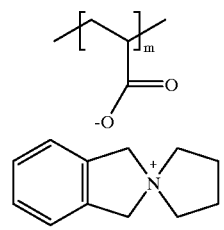

Polymer 1

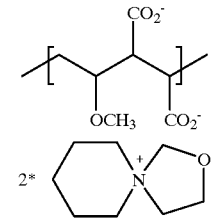

Polymer 2

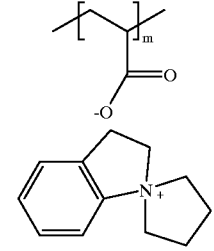

Polymer 3

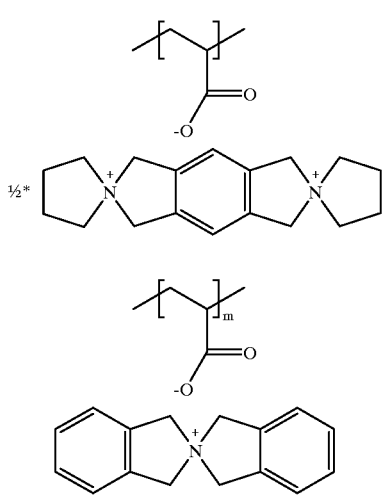

Polymer 4

Polymer 5

All of the polymers were prepared by a general synthetic sequence consisting of: (1) the synthesis of a spiro-quaternary ammonium halide, (2) conversion of the halide to its hydroxide salt using silver (I) oxide, and (3) the neutralization of a carboxylic acid-containing polymer using the spiro-quaternary ammonium hydroxide to yield a solution of the desired polymer in methanol-water. In all cases, the quaternary ammonium halide salts were characterized by $^1$H NMR and electrospray mass spectrometry. For Polymers 1, 3, 4, and 5, the purity was additionally determined by reverse phase HPLC. In all cases, the halide salts were found to be at least 95% pure. The spiro-ammonium hydroxide salts were stored as solutions in water/methanol and were never isolated. The hydroxide concentrations of the solutions were determined by hydrochloric acid titration. The hydroxide salts were further characterized by electrospray mass spectrometry and the purity of the solutions that contained aromatic moieties (Polymers 1, 3, 4, and 5) were further checked by reverse phase HPLC. Due to their hygroscopic nature, the spiro-ammonium hydroxide salts and the spiro-ammonium carboxylate polymers were stored as solutions and were never isolated. The extent of neutralization was determined by monitoring the disappearance of the carboxylic acid IR band (1720 cm$^{-1}$) and the appearance of the corresponding carboxylate anion band (1550–1580 cm$^{-1}$).

EXAMPLE 1

Preparation of Polymer 1 Solution

A] Pyrrolidine (48.93 g, Aldrich Chemical) was added using an addition funnel over 30 minutes to a solution of α,α'-dibromo-o-xylene (45.40 g, Aldrich Chemical) in diethyl ether (408 g). A white precipitate formed almost immediately. The solvent was decanted from the precipitated solid and the crude product was recrystallized from isopropanol, washed three times with diethyl ether, and dried overnight in a vacuum oven at 60° C. to afford a very hygroscopic powder. The purified product was stored as a solution in methanol of 25.4% solids.

B] The product solution of step A was combined in a 500 ml round bottomed flask with 9:1 methanol:water (130 ml) and silver (I) oxide (16.59 g). The flask grew slightly warm and the undissolved solids turned from black to a dull gray. The reaction solution was allowed to stir for an hour at room temperature and the insoluble materials were filtered off. The filtrates were passed through a flash chromatography column packed with 300 cm$^3$ of DOWEX® 550A OH resin using a methanol eluent. The collected fractions were concentrated to a weight of 36 g by rotary evaporation. The concentration of hydroxide anion was determined to be 2.218 meq/g by HCl titration.

C] An aqueous solution [12.00 g of a 25% (w/w)] of polyacrylic acid (Polysciences, MW~90,000) was combined with 11.44 g of methanol and 18.77 g of the solution from step B. A gummy precipitate initially formed and was slowly redissolved over 30 minutes. The resulting polymer was stored as an 18% (w/w) solution in water/methanol.

EXAMPLE 2

Preparation of Polymer 2 Solution

A] Preparation of N-ethoxyethyl piperidine

Piperidine (Aldrich, 500 g) was slowly added to 500 g of 35–40% formaldehyde in an ice-water bath at such a rate as to maintain the temperature at 30–40° C. After the addition was finished, 500 ml of absolute ethanol was added in one portion and the solution was saturated with potassium carbonate. The upper layer was separated and extracted by rapid stirring with another 500 ml of ethanol. The combined ethanolic fractions were stirred over potassium carbonate, filtered, combined with 1 liter of benzene, and transferred to a distillation assembly. Heating was initiated and after ~1 liter of the benzene/ethanol/water azeotrope was collected, a second 1 liter of benzene was added and the distillation was continued. After all of the benzene was distilled off, an aspirator vacuum was applied and the product was distilled off. The product was further purified by redistillation through a glass helix packed column (BP=50° C./5.0 mm). About 620 g were collected (74% yield).

B] Preparation of 3-oxa-1-azoniaspiro[4,5]decane, chloride salt

2-Chloroethanol (131 ml) and 400 ml benzene were heated to reflux and ~50 ml of a forerunner was removed. The product of Step A (72 g) was slowly added via addition funnel over about 30 minutes. During the addition, the product began to separate out as an oil. The benzene layer was decanted off and the oil was washed twice with ether and left on a vacuum line overnight. The product was analyzed by $^1$H NMR and electrospray mass spectrometry and was found to be pure by both methods. About 75 g of product was collected (84% yield).

C] Preparation of 3-oxa-1-azoniaspiro[4,5]decane, hydroxide salt

The product from the previous step (8 g) was combined in a 500 ml round bottomed flask with 80 g of 9:1 water:methanol and 10.4 g silver (I) oxide. The mixture was stirred at room temperature for one hour at which point the insoluble compounds had turned to a steel gray color. The silver salts were removed by vacuum filtration through a Teflon membrane filter and the filtrates were concentrated to 27.5 g using a rotary evaporator. The concentration of hydroxide anion was determined to be 1.14 meq/g by titration with hydrochloric acid.

D] Preparation of Polymer 2 solution

A 10% (w/w) solution of poly (methyl vinyl ether-co-maleic anhydride) was prepared by stirring 1.00 g of GANTREZ AN-139 polymer (ISP Technologies) in 9.0 g distilled water for an hour, at which point a homogeneous solution had formed. Methanol (2.34 g) was added with vigorous stirring followed by 3.84 g of the hydroxide solution from the previous step. Analysis by IR showed complete disappearance of the carboxylic acid band (1720 cm$^{-1}$) and the appearance of a carboxylate band (1572 cm$^{-1}$).

EXAMPLE 3

Preparation of Polymer 3 Solution

A] Indoline (Aldrich, 14.06 g), 1,4-bromobutane (Aldrich, 25.48 g) and ammonium hydroxide (28% aqueous solution, Aldrich, 45.0 g) were combined in a 500 ml round bottomed flask fitted with an addition funnel and a condenser. The reaction mixture was heated to reflux and 23.0 g of additional ammonium hydroxide solution was added dropwise over 30 minutes. The reaction solution was heated at reflux overnight and the liquids were evaporated from the crude product using a rotary evaporator. The remaining brown solids were dissolved in hot isopropanol and filtered hot to remove residual ammonium bromide. The filtrates were concentrated to orange oil, dissolved in 200 ml methanol, adsorbed onto about 100 cm$^3$ silica gel, and loaded onto the top of a flash chromatography column packed with about 1000 cm$^3$ of silica gel. The column was first eluted with 1:1 ethyl acetate:hexane to remove an organic-soluble impurity, and then with methanol to elute the desired product. The collected methanolic solution was concentrated to yellowish oil on a rotary evaporator to provide 15.0 g of the purified spiro-indolinium bromide salt.

B] All of the purified product from Step A was dissolved in 150 ml of a 9:1 methanol:water mixture. It was then converted to the corresponding hydroxide salt with silver (I) oxide (27.34 g) in an analogous manner as described for Polymer 1 (Step B). A solution (41.9 g) of 1.300 meq/g of hydroxide anion was obtained.

C] A 25% (w/w) aqueous solution (5.00 g) of polyacrylic acid (Polysciences, MW~90,000) was combined with 13.34 g of the solution from step B. A gummy precipitate initially formed and was slowly redissolved over 30 minutes. The resulting polymer was stored as a 23.28% (w/w) solution in a water/methanol mixture.

EXAMPLE 4

Preparation of Polymer 4 Solution

A] 1,2,4,5-Tetrakis (bromomethyl)benzene (10.26 g) was stirred as a suspension in 90 ml of ethyl acetate. Pyrrolidine (6.49 g) was added all at once and a white precipitate formed instantaneously. The reaction was allowed to stir for 72 hours at which point a sticky, brown solid had formed at the bottom of the flask. The ethyl acetate was decanted off and the brown solid was dissolved in 100 ml of methanol. Sodium carbonate (10.00 g) was added and the mixture was stirred for 2 hours. The solids were filtered off and the solution was concentrated to a tan solid using a rotary evaporator. The crude product was purified by recrystallization from absolute ethanol and dried in a vacuum oven at 60° C. overnight to afford 6.60 g (67% yield) of fine white crystals. The product was characterized by $^1$H NMR and electrospray mass spectrometry.

B] The dibromide salt (11.83 g) obtained from Step A (and from another successive run of the synthesis) was converted to the corresponding dihydroxide salt using silver (I) oxide via a procedure analogous to the one described for making Polymer 2, Step C. The procedure yielded 33.76 g of a solution with a hydroxide anion concentration of 1.328 meq/g.

C] An aqueous solution [11.47 g of a 25% (w/w)] of polyacrylic acid (Polysciences, MW~90,000) was combined with 30.00 g of the solution from step B. A gummy precipitate initially formed and was slowly redissolved over 30 minutes. The resulting polymer was stored as a 20% (w/w) solution in water/methanol.

EXAMPLE 5

Preparation of Polymer 5 Solution

A] Anhydrous ammonia (Aldrich) was bubbled through a rapidly stirring suspension of α,α'-dibromo-o-xylene (26.36 g, Aldrich Chemical) in absolute ethanol (300 ml) for 2.5 hours. The resulting slurry was placed in a freezer for 2 hours and then filtered. The collected white solids were washed once with isopropanol and once with diethyl ether to afford 7.95 g of the quaternary ammonium bromide product as fine, white crystals.

B] The product from step A (7.39 g) was converted from the bromide to the hydroxide using 5.65 g silver (I) oxide and 70 ml of a 9:1 methanol:water mixture in an analogous manner as used for Polymer 1 (Step B). A solution (14.50 g) of 1.452 meq/g of hydroxide anion was obtained.

C] An aqueous solution [5.02 g of a 25% (w/w)] of polyacrylic acid (Polysciences, MW~90,000) was combined with 14.14 g of methanol and 12.00 g of the solution from step B. A gummy precipitate initially formed and was slowly redissolved over 30 minutes. The resulting polymer was stored as a 16% (w/w) solution in water/methanol.

The invention has been described in detail with particular reference to certain preferred embodiments thereof, but it will be understood that variations and modifications can be effected within the spirit and scope of the invention.

I claim:

1. An ionomer having carboxylate recurring units in its backbone and an ammonium counterion for said carboxylate recurring units wherein one or more positively charged nitrogen atoms of the counterion are positioned at tetrahedral vertices of one or more spiro bicyclic ring systems.

2. The ionomer of claim 1 represented by the following Structure I or II:

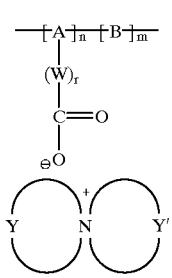

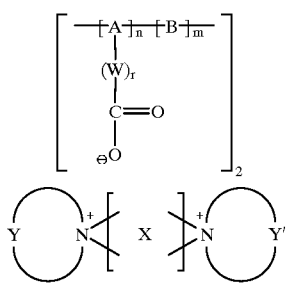

II wherein A represents recurring units comprising a quaternary ammonium carboxylate, B represents recurring units derived from one or more non-carboxylate ethylenically unsaturated polymerizable monomers, W is a linking spacer unit, Y and Y' represent any combination of carbon, nitrogen, oxygen, sulfur, phosphorous or selenium atoms to complete independently at least a 3-membered heterocyclic ring system with the illustrated nitrogen, X represents the carbon, nitrogen, oxygen, sulfur, phosphorus, nitrogen or selenium atoms to complete at least a 4-membered ring system with the two illustrated nitrogen atoms, r is 0 or 1, m is 0 to about 99 mol %, and n is from about 1 to 100 mol %.

3. The ionomer of claim 2 wherein r is 0.

4. The ionomer of claim 2 wherein r is 1 and W is a divalent alicyclic, aliphatic or aromatic group.

5. The ionomer of claim 4 wherein W is an alkylene or arylene group, either of which can include an ester or amide group.

6. The ionomer of claim 2 wherein m is 0 to about 50 mol % and n is from about 50 to 100 mol %.

7. The ionomer of claim 2 wherein A represents recurring units derived from ethylenically unsaturated polymerizable acrylates, methacrylates, acrylamides, methacrylamides, maleic acid or anhydride, or itaconic acid or anhydride.

8. The ionomer of claim 2 wherein B represents recurring units derived from ethylenically unsaturated acrylates, methacrylates, styrene or its derivatives, acrylamides, methacrylamides, olefins, vinyl halides, vinyl ethers, or vinyl carboxylates that are not quaternized.

9. The ionomer of claim 2 wherein Y and Y' independently complete substituted or unsubstituted aziridine, azetidine, oxapyrrolidine, morpholine, piperidine, pyrrolidine, carbazole, indoline or isoindoline rings.

10. The ionomer of claim 1 having a molecular weight of at least 2000 Daltons.

11. The ionomer of claim 1 that is one of the following Polymers 1 through 5:

Polymer 1

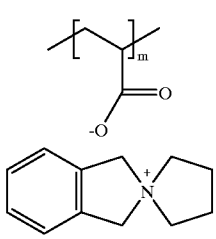

Polymer 2

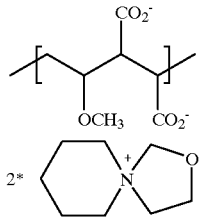

Polymer 3

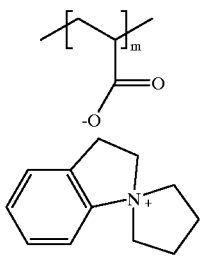

Polymer 4

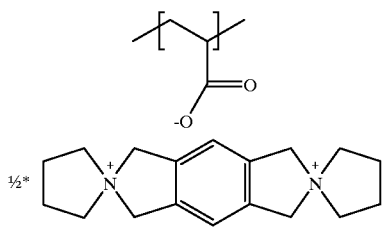

Polymer 5

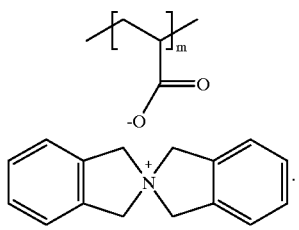

* * * * *